(12) United States Patent
Zhou et al.

(10) Patent No.: US 8,379,582 B2
(45) Date of Patent: Feb. 19, 2013

(54) COMMUNICATION SYSTEMS

(75) Inventors: Yuefeng Zhou, Oxshott (GB); Michael John Beems Hart, London (GB); Sunil Keshavji Vadgama, Middlesex (GB)

(73) Assignee: Fujitsu Limited, Kawasaki-shi (JP)

( * ) Notice: Subject to any disclaimer, the term of this patent is extended or adjusted under 35 U.S.C. 154(b) by 411 days.

(21) Appl. No.: 12/377,640

(22) PCT Filed: Jul. 31, 2007

(86) PCT No.: PCT/GB2007/002888
§ 371 (c)(1),
(2), (4) Date: Jun. 4, 2010

(87) PCT Pub. No.: WO2008/020163
PCT Pub. Date: Feb. 21, 2008

(65) Prior Publication Data
US 2010/0238853 A1    Sep. 23, 2010

(30) Foreign Application Priority Data

Aug. 18, 2006 (GB) .................................. 0616478.4

(51) Int. Cl.
*H04W 4/00* (2009.01)
*H04B 7/208* (2006.01)

(52) U.S. Cl. ........................................ 370/329; 370/344
(58) Field of Classification Search .................. 370/328, 370/329, 343, 344
See application file for complete search history.

(56) References Cited

U.S. PATENT DOCUMENTS

| | | | |
|---|---|---|---|
| 6,034,946 A | | 3/2000 | Roginsky et al. |
| 2004/0213198 A1* | 10/2004 | Mahmood et al. ............ 370/349 |
| 2005/0185632 A1* | 8/2005 | Draves et al. ................. 370/351 |
| 2005/0286426 A1* | 12/2005 | Padhye et al. ................ 370/238 |

FOREIGN PATENT DOCUMENTS

| | | |
|---|---|---|
| EP | 1 617 608 | 1/2006 |
| JP | 2005177738 | 6/2005 |

OTHER PUBLICATIONS

Japanese Office Action, Application No. 2009-525094, with English Translation, 7 pages, May 31, 2011.
Patent Cooperation Treaty, "Notification Concerning Transmittal of International Preliminary Report on Patentability (Chapter 1 of the Patent Cooperation Treaty (PCT Rule 44bis.1(c))," International Application No. PCT/GB2007/002888, 8 pages, Mailed Mar. 5, 2009.
Royer, "A Review of Current Routing Protocols for Ad Hoc Mobile Wireless Networks," IEEE Personal Communications, Apr. 1999, pp. 46-53.

* cited by examiner

*Primary Examiner* — Ronald Abelson
(74) *Attorney, Agent, or Firm* — Baker Botts L.L.P.

(57) ABSTRACT

A path selection method for use in a communication system is provided. The system includes at least three communication apparatuses, a particular one of said apparatuses being operable to transmit and/or receive a communication signal along at least two different communication paths, each said path being either a single-link path extending from the particular apparatus to another said apparatus directly over a single communication link therebetween, or being a multi-link path extending from the particular apparatus to said other or another said apparatus indirectly via one or more intermediate said apparatuses over a plurality of consecutive such links link-by-link along the path, and at least one said path being such a multi-link path. The method includes, for each link along at least the or one of the multi-link paths, obtaining link-suitability information indicative of the suitability of the link concerned for transmission and/or reception. The method also includes, for at least the or said one of the multi-link paths, combining the link-suitability information for each link of the path concerned so as to generate path-suitability information indicative of the suitability of the path concerned for transmission and/or reception. Furthermore, the method includes selecting one of said paths for transmission and/or reception in dependence upon said path-suitability information.

1 Claim, 7 Drawing Sheets

BS can cover the MS.
An MS will have many possible paths to communication with BS in WiMAX relay systems. The system has to choose an optimal path for the communication between MS and BS BS can cover the MS.
An MS will have many possible paths to communication with BS in WiMAX relay systems. The system has to choose an optimal path for the communication between MS and BS BSs cannot cover MS.
The system has to choose either RS 1# or RS 2# to relay the information between MS and BSs An example of calculating PoR values An example of the signalling related to PoR table broadcast Example TDD frame structure from OFDMA physical layer of the IEEE802.16 standard

COMMUNICATION SYSTEMS

RELATED APPLICATION

This application claims foreign priority benefits under 35 U.S.C. §119 of International Application No. PCT/GB2007/002888, filed Jul. 31, 2007, entitled "Communication Systems" and United Kingdom Application No. GB 0616478.4, filed on Aug. 18, 2006, entitled "Communication Systems".

CROSS-REFERENCE TO RELATED APPLICATIONS

This application relates to the following applications, each of which is incorporated herein by reference:
COMMUNICATION SYSTEMS, application Ser. No. 11/840,492, filed Aug. 17, 2007 and currently pending;
COMMUNICATION SYSTEMS, application Ser. No. 11/840,518, filed Aug. 17, 2007 and currently pending;
COMMUNICATION SYSTEMS, application Ser. No. 11/840,546, filed Aug. 17, 2007 and currently pending;
COMMUNICATION SYSTEMS, application Ser. No. 11/840,570, filed Aug. 17, 2007 and currently pending;
COMMUNICATION SYSTEMS, application Ser. No. 11/840,595, filed Aug. 17, 2007 and currently pending;
COMMUNICATION SYSTEMS, application Ser. No. 11/840,621, filed Aug. 17, 2007 and currently pending;
COMMUNICATION SYSTEMS, application Ser. No. 11/840,644, filed Aug. 17, 2007 and currently pending;
COMMUNICATION SYSTEMS, application Ser. No. 12/377,629, filed Feb. 16, 2009 and currently pending;
TIMING ADJUSTMENT IN MULTI-HOP COMMUNICATION SYSTEM, application Ser. No. 12/377,634, filed Feb. 16, 2009 and currently pending.

OVERVIEW

Currently there exists significant interest in the use of multihop techniques in packet based radio and other communication systems, where it is purported that such techniques will enable both extension in coverage range and increase in system capacity (throughput).

In a multi-hop communication system, communication signals are sent in a communication direction along a communication path (C) from a source apparatus to a destination apparatus via one or more intermediate apparatuses. FIG. 5 illustrates a single-cell two-hop wireless communication system comprising a base station BS (known in the context of 3 G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIG. 6 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 6 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 6 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L = b + 10 n \log d \quad (A)$$

Where d (meters) is the transmitter-receiver separation, b(db) and n are the pathloss parameters and the absolute pathloss is given by $l = 10^{(L/10)}$.

The sum of the absolute path losses experienced over the indirect link SI+ID may be less than the pathloss experienced over the direct link SD. In other words it is possible for:

$$L(SI) + L(ID) < L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both sub-carriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \; 0 \leq t \leq T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \epsilon C_n$, $c = (c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE802.16 standard incorporates both an FDD and TDD mode.

As an example, FIG. 7 illustrates the single hop TDD frame structure used in the OFDMA physical layer mode of the IEEE802.16 standard (WiMAX).

Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

In accordance with one embodiment of the present invention, a path selection method for use in a communication system is provided. The system includes at least three communication apparatuses, a particular one of said apparatuses being operable to transmit and/or receive a communication signal along at least two different communication paths, each said path being either a single-link path extending from the particular apparatus to another said apparatus directly over a single communication link therebetween, or being a multi-link path extending from the particular apparatus to said other or another said apparatus indirectly via one or more intermediate said apparatuses over a plurality of consecutive such links link-by-link along the path, and at least one said path being such a multi-link path. The method includes, for each link along at least the or one of the multi-link paths, obtaining link-suitability information indicative of the suitability of the link concerned for transmission and/or reception. The method also includes, for at least the or said one of the multi-link paths, combining the link-suitability information for each link of the path concerned so as to generate path-suitability information indicative of the suitability of the path concerned for transmission and/or reception. Furthermore, the method includes selecting one of said paths for transmission and/or reception in dependence upon said path-suitability information.

BRIEF DESCRIPTION OF THE DRAWINGS

For a more complete understanding particular embodiments of the present invention and its advantages, reference is now made to the following description, taken in conjunction with the accompanying drawings, in which.

DETAILED DESCRIPTION

In WiMAX and other networks, a mobile station (MS) may face many possible paths to exchange information with base station (BS). Approaches should be designed for MS to select an optimal path. Especially, in mobile environment, the radio channel condition will be dynamically changing, thus a MS should dynamically select a proper relay station (RS), or BS for handover.

Figure 1:
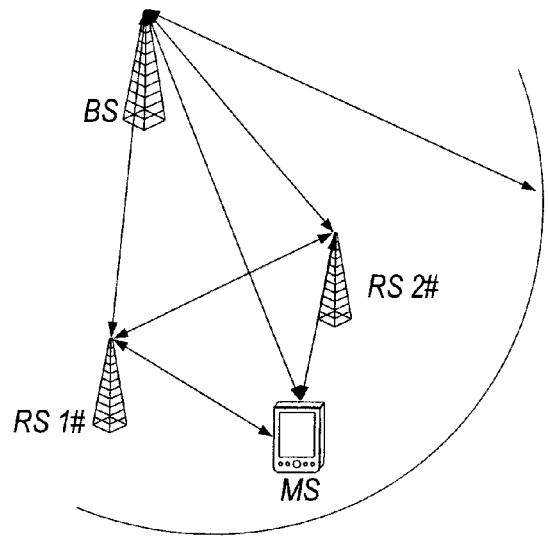
FIG. 1 shows a Scenario 1 where a BS can cover an MS.
Figure 2:
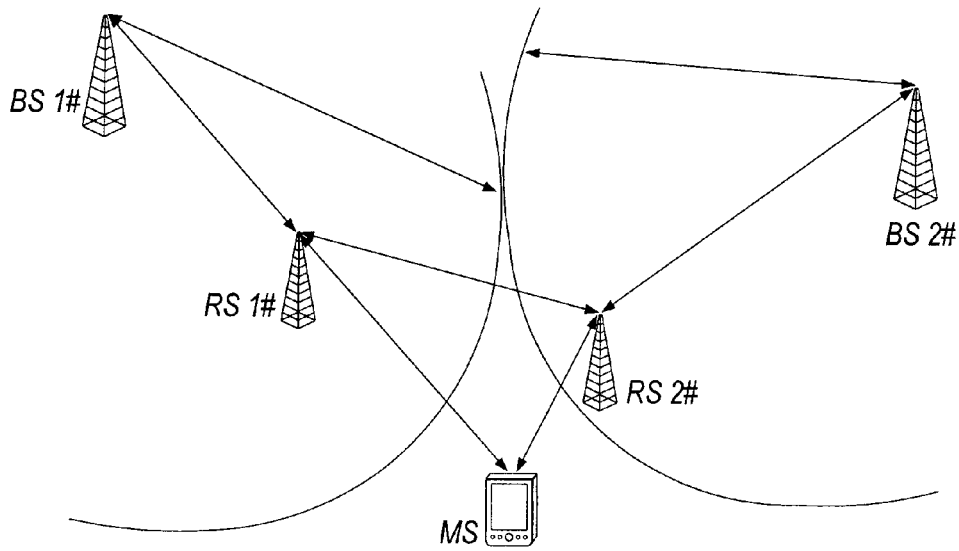
FIG. 2 shows a Scenario 2 where BSs cannot cover an MS (where the system has to choose either RS 1# or RS 2# to relay the information between MS and BSs)

FIGS. 1 and 2 illustrate scenarios of WiMAX relay systems, where the Mobile Station (MS) could connect to BS directly, or ask RS 1# or RS 2# for relay. Obviously, in FIG. 1, following paths are possible for the communication between MS and BS:

a. MS→BS
b. MS→RS1#→BS
c. MS→RS1#→RS2→BS
d. MS→RS2#→BS
e. MS→R52#→RS1→BS

The system shall decide an optimal path for the handover of MS. This decision should be based on the link quality, QoS demand, and so on. Especially in high mobility case, the MS's status will be dynamically changing, thus the RS/BS selection approach will be very important to maintain an acceptable QoS level in MS.

An MS will have many possible paths to communication with BS in WiMAX relay systems. The system has to choose an optimal path for the communication between MS and BS.

The system has to choose either RS 1# or RS 2# to relay the information between MS and BSs.

The previous method for MS to decide the handover is using link quality, such as CINR, which could be measured from preamble or other pre-determined receiving sequences. However, in WiMAX relay systems, we may encounter issues as listed below for MS's handover decision, which are considered in this proposed patent.

1. Link quality metrics, such as CINR, and RSSI, are not enough for BS/RS selection for relay systems. For example, if RS 2# has better CINR than RS 1#, but RS 2# does not have enough available bandwidth to afford a kind level of QoS level for MS, then MS may choose RS 1 # for relay;

2. If considering multiple metrics for BS/RS selection, the overhead of signaling may be increased;

3. The relay path will be more than two hops, such as the listed path c, and e. Therefore, how to measure link quality of multi-hop path, and how to signaling each other with small increasing overhead are the possible issues.

4. To support high mobility users, the metrics for BS/RS selection should be efficiently refreshed.

Details of the Proposed BS/RS Selection Scheme

Definition of the Selection Metric, Potent of Relay (PoR):

Each path will have a value of PoR to indicate the potential to afford relay for MS. Greater a potential value is, higher probability this path will have to act as a relay path. Each RS and MS will maintain a table to list the values of PoR for different paths. For example, as shown in FIG. 2, RS 1# has two paths to communicate with BSs, which are "RS 1#-BS1#", and "RS 1#-RS 2#-BS 2#", therefore, an PoR-path table will be maintained in a table as below:

TABLE 1

| | PoR values maintained in RS 1# | |
|---|---|---|
| Recorded Path | PoR of the path "RS 1#-BS 1#" | PoR of the path "RS 1#-RS 2#-BS 2#" |
| PoR value | PoR$_{RS\ 1\#-BS\ 1\#}$ | PoR$_{RS\ 1\#-BS\ 2\#}$ |

A generic PoR definition between two stations, A and B, can be written as:

$$PoR_{A-B} = \alpha \cdot e^{-\frac{\prod k_n \cdot \eta_n}{\prod \lambda_m \cdot \gamma_m}} \quad (k_n > 0; \eta_n > 0; \lambda_m > 0; \gamma_m > 0) \quad (1)$$

where $\eta_n$, n=1, 2, 3 . . . , is the negative factor, which means that the probability of acting relay path will be decreased if this value increases. For example, a typical negative factor is path loss. $k_n$ is the corresponding weight for this particular negative factor. $\gamma_m$, n=1, 2, 3 . . . , is the positive factor, which means that the probability of acting relay path will be increased if this value increases. For instance, available bandwidth is a positive factor. $\lambda_m$ is the weight for the $m^{th}$ positive factor. $\alpha$ is the weight for this path. Some types of path can have higher weight value of $\alpha$. For example, if we consider latency and signaling overhead, one-hop path can have bigger value of $\alpha$ than multi-hop paths.

If a path is multi-hop, then the PoR of this path is the product of the PoR values of all the links within this path. For example, the PoR value of a path "A-B-C" can be calculated by:

$$PoR_{A-B-C} = PoR_{A-B} \times PoR_{B-C}, \quad (2)$$

For example, if we consider path loss, $P_L$, and available bandwidth, $BW_a$, as the metrics for BS/RS selection, the PoR of link "A-B" can be defined as:

$$PoR_{A-B} = \alpha \cdot e^{-\frac{P_L}{min\{BW_{a\_A}, BW_{a\_B}\}}} (k > 0) \quad (3)$$

where $P_L$ is the path loss, min{$BW_{a\_A}$, $BW_{a\_B}$} is the minimal available bandwidth value of each node in the path. If the pass loss and available bandwidth are listed in FIG. 3, we can calculate PoR values in RS 1# as:

$$PoR_{RS1\#-BS1\#} = \alpha_1 \cdot e^{-\frac{25}{min\{0.5,1.5\}}} = \alpha_1 \cdot e^{-50} \quad (3)$$

$$PoR_{RS1\#-BS2\#} = \alpha_2 \cdot e^{-\frac{22}{min\{1.5,1.5\}} - \frac{15}{min\{1.5,2.5\}}} = \alpha_2 \cdot e^{-25}$$

If we simply let $\alpha_1 = \alpha_2 = 1$, obviously, in terms of the definition of PoR, path "RS 1#-BS 2 #" is an optimal path for relay.

RS/BS Selection Method for Handover:

A PoR-path table should be maintained by RSs and MSs.

Step 1: Update PoR of the links between RS/MS and BS

An RS/MS calculates the PoR values of the link between neighboring BSs and itself. The link quality measurement relating to this measurement can depend on the received preamble, pilot subcarriers, synchronization symbols etc.

Figure 3:
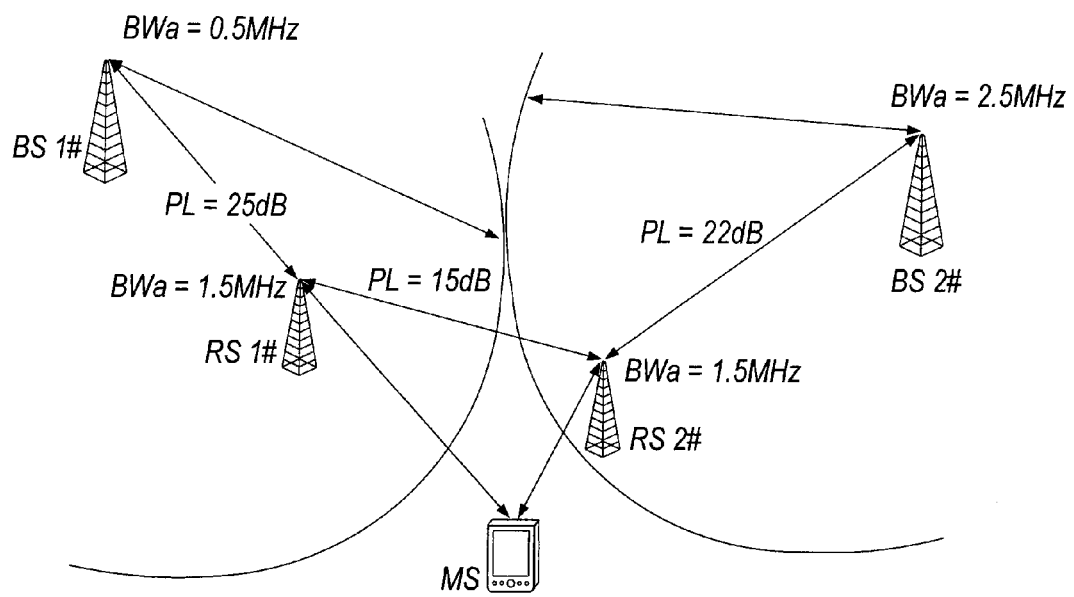
FIG. 3 shows an example of calculating PoR values.

For example, in FIG. 3, since RS 1# and RS 2# only has one neighboring BS, then the updated PoR-path tables in RS 1#, and RS 2# become:

TABLE 2

PoR table in RS 1#

| Recorded Path | PoR of the path "RS 1#-BS 1#" | ... |
|---|---|---|
| PoR value | PoR$_{RS\ 1\#-BS\ 1\#}$ | ... |

TABLE 2

PoR table in RS 2#

| Recorded Path | PoR of the path "RS 2#-BS 2#" | ... |
|---|---|---|
| PoR value | PoR$_{RS\ 2\#-BS\ 2\#}$ | ... |

Step 2: Update PoR of the Paths between an RS/MS and its neighboring RS.

Within this step, an RS shall broadcast its PoR table to its neighboring RS and MS. Each RS/MS shall update its PoR table in terms of the received PoR tables.

Figure 4:
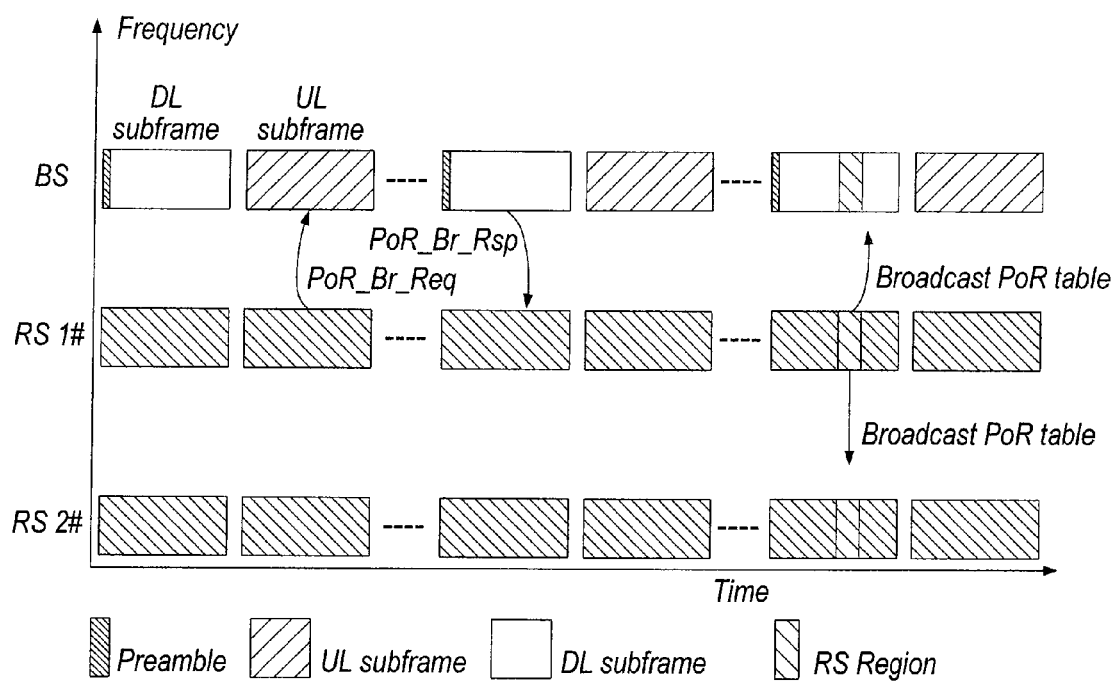
FIG. 4 shows an example of the signaling related to PoR table broadcast.
Figure 5:
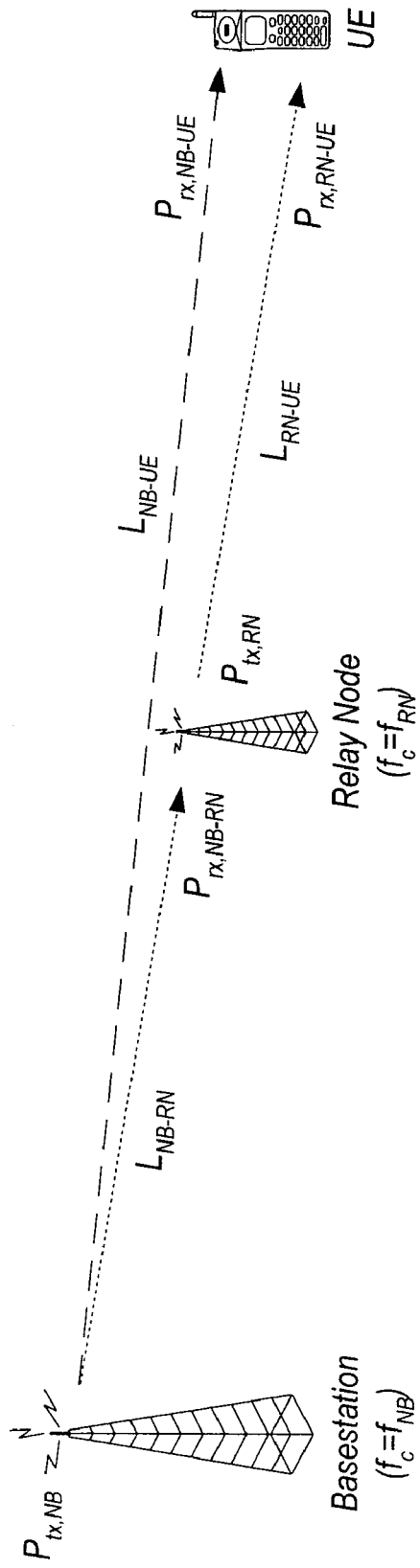
FIG. 5 shows a single-cell two-hop wireless communication system.
Figure 6A:
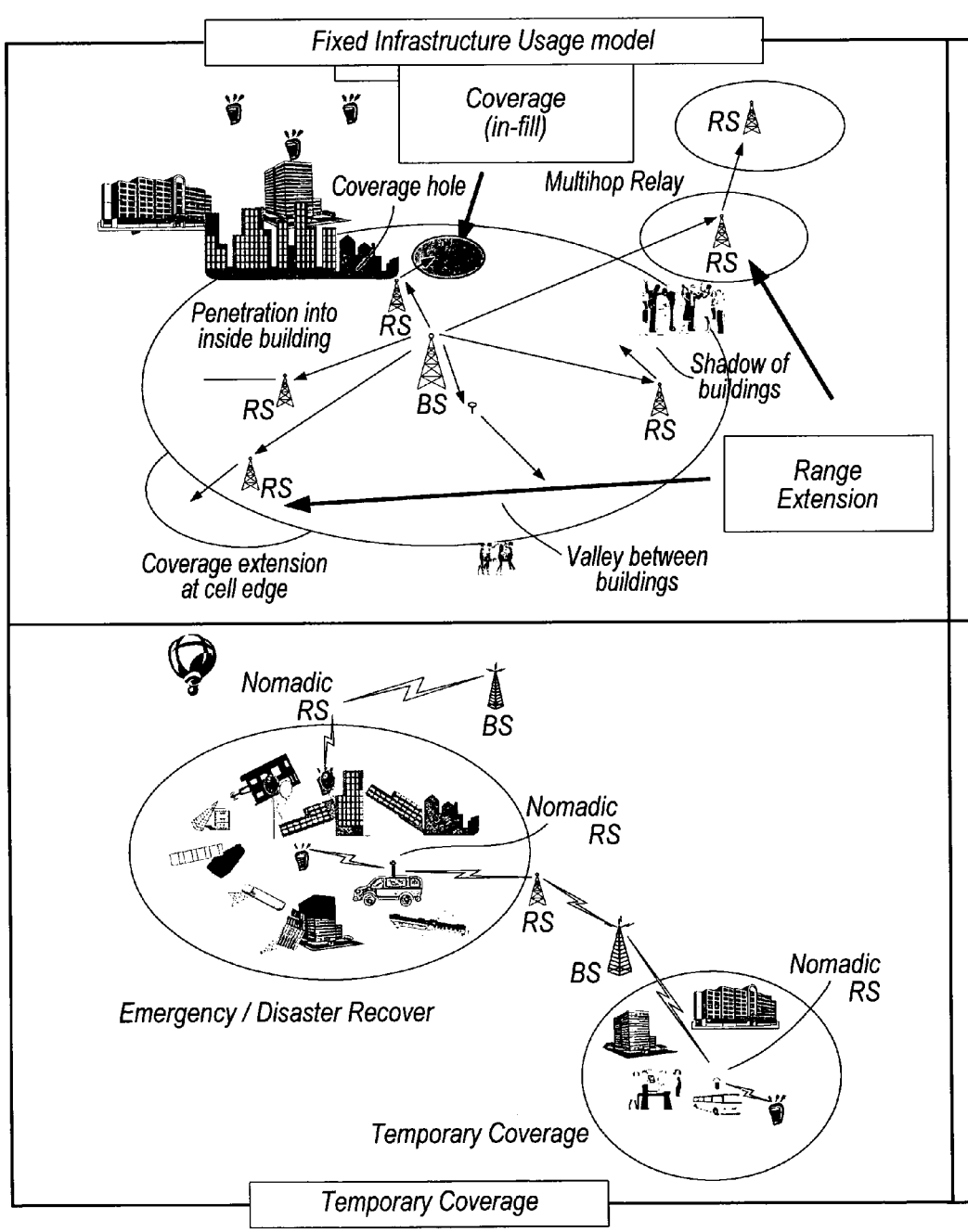
FIG. 6 shows applications of relay stations.
Figure 6B:
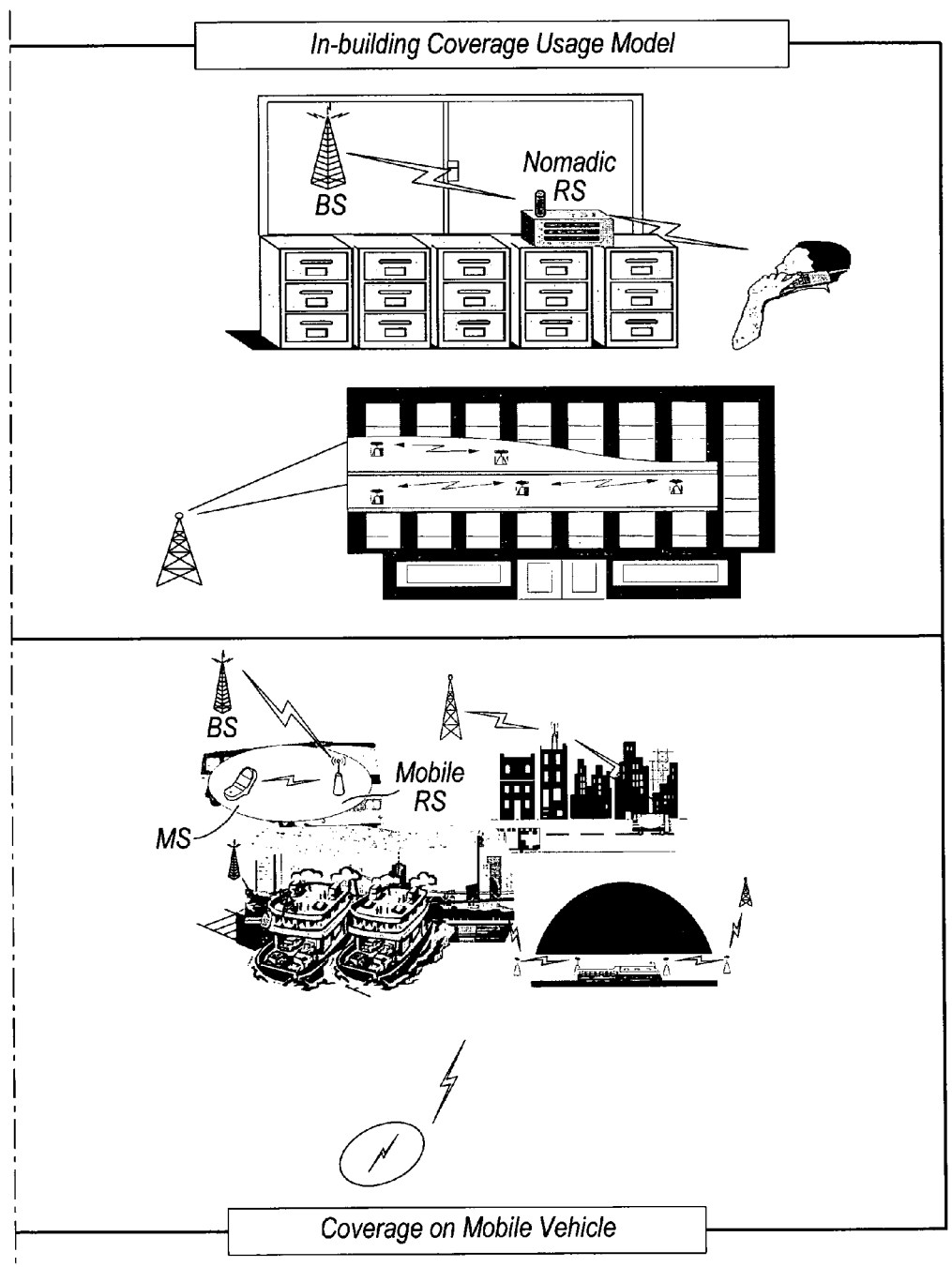
Figure 7:
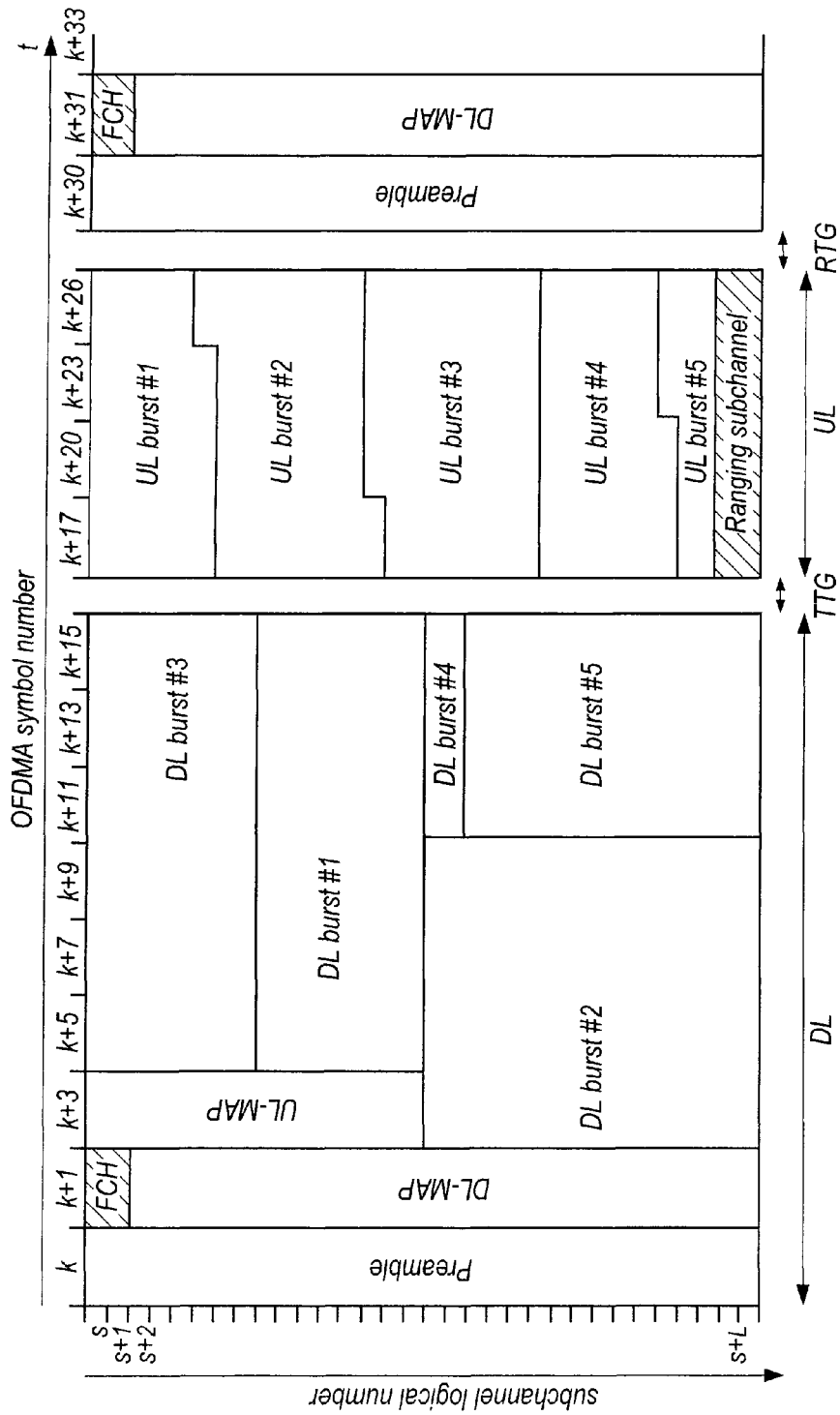
FIG. 7 shows a single hop TDD frame structure used in the OFDMA physical layer mode of the IEEE 802.16 standard.

Firstly, an RS will send a PoR-table-broadcast request, PoR_Br_Req, to its BS. BS will allocate slots in downlink subframe for the RS broadcasting the PoR table. FIG. 4 gives an example of the signaling relating to PoR table broadcast with WiMAX TDD frame structure:

In FIG. 4. after receiving an PoR_Br_Req, the BS will send an response, PoR_Br_Rsp, to the corresponding RS. The PoR_Br_Rsp packet includes the allocation information of an RS Region in downlink subframe, which can allow RS to broadcast its PoR table and other information.

An RS can broadcast a pre-decided sequence within this RS region, thus other RSs and MSs can use this sequence to measure the link quality. RSs can also broadcast other metrics, such as available bandwidth, within this RS region.

An RS/MS will calculate the PoR value of the link between itself and the RS, who broadcasted the PoR table. For example, in FIG. 4, RS 2# can calculate the PoR$_{RS\ 2\#-RS\ 1\#}$ in terms of the received information, such as mentioned the available bandwidth, and the pre-decided sequence. Then RS 2# shall multiply PoR$_{RS\ 2\#-RS\ 1\#}$ with the received PoR$_{RS\ 1\#-BS\ 1\#}$ to obtain the PoR value of the link "RS 2#-RS 1#-BS", and update its PoR table.

Periodically, an MS shall check the PoR-path table to find an optimal path with the maximal value of PoR for handover.

Main Benefits

Particular embodiments may give an efficient solution for BS/RS selection for MS's handover in WiMAX system. The benefits from particular embodiments are:

1. Through the associated improvement in performance (due to select an optimal BS or RS for handover to guarantee the QoS) to differentiate FUJITSU's wireless/cable OFDMA (such as WiMAX) from that of our competitors;
2. The proposed method gives an approach of selecting the optimal BS/RS for handover in non-relay system, and multi-hop relay system;
3. By dynamically selecting an optimal BS/RS, the MS can adapt to the dynamically changing radio environment and QoS demands;
4. A novel metric, named the potential of relay (PoR), is defined to combine various QoS, or link quality related metrics, to aid the BS/RS selection and decrease the signaling overhead. This metric gives a feasible way to calculate the quality of multi-hop or single-hop links;
5. A genetic signaling mechanism is designed for the proposed selection method, which can be compatible with IEEE802.16e;
6. More flexible for distributed implementation. A distributed implementation can release the computation and signaling load in BS;
7. The definition of RS region gives an feasible method for RSs to broadcast/transmit information to other RSs, and MSs.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

What is claimed is:

1. A path selection method for use in a communication system, the system comprising at least three communication apparatuses, a particular one of said apparatuses being operable to transmit and/or receive a communication signal along at least two different communication paths, each said path being either a single-link path extending from the particular apparatus to another said apparatus directly over a single communication link therebetween, or being a multi-link path extending from the particular apparatus to said other or another said apparatus indirectly via one or more intermediate said apparatuses over a plurality of consecutive such links link-by-link along the path, and at least one said path being such a multi-link path, the method comprising:

for each link along at least the or one of the multi-link paths, obtaining link-suitability information, PoR, indicative of the suitability of the link concerned for transmission and/or reception, wherein the link suitability information, PoR, for each link is defined for a link between apparatuses A and B as:

$$PoR_{A-B} = \alpha \cdot e^{-\frac{\prod k_n \cdot \eta_n}{\prod \lambda_m \cdot \gamma_m}} \quad (k_n > 0; \eta_n > 0; \lambda_m > 0; \gamma_m > 0)$$

where $\eta_n$, n=1, 2, 3 . . . , is a negative factor, $k_n$ is the corresponding weight for the $n^{th}$ negative factor, $\gamma_m$, m=1, 2, 3 . . . , is a positive factor, $\lambda_m$ is the weight for the $m^{th}$ positive factor, and $\alpha$ is the weight for the link from apparatus A to apparatus B;

for at least the or said one of the multi-link paths, combining the link-suitability information for each link of the path concerned by multiplying the PoR for each of those links together so as to generate path-suitability information indicative of the suitability of the path concerned for transmission and/or reception; and selecting one of said paths for transmission and/or reception in dependence upon said path-suitability information.

\* \* \* \* \*